Oct. 24, 1939.         A. G. WHITEHEAD         2,177,011
            HYDRAULIC GEAR SHIFTING MECHANISM
                Filed Dec. 23, 1937      2 Sheets-Sheet 1
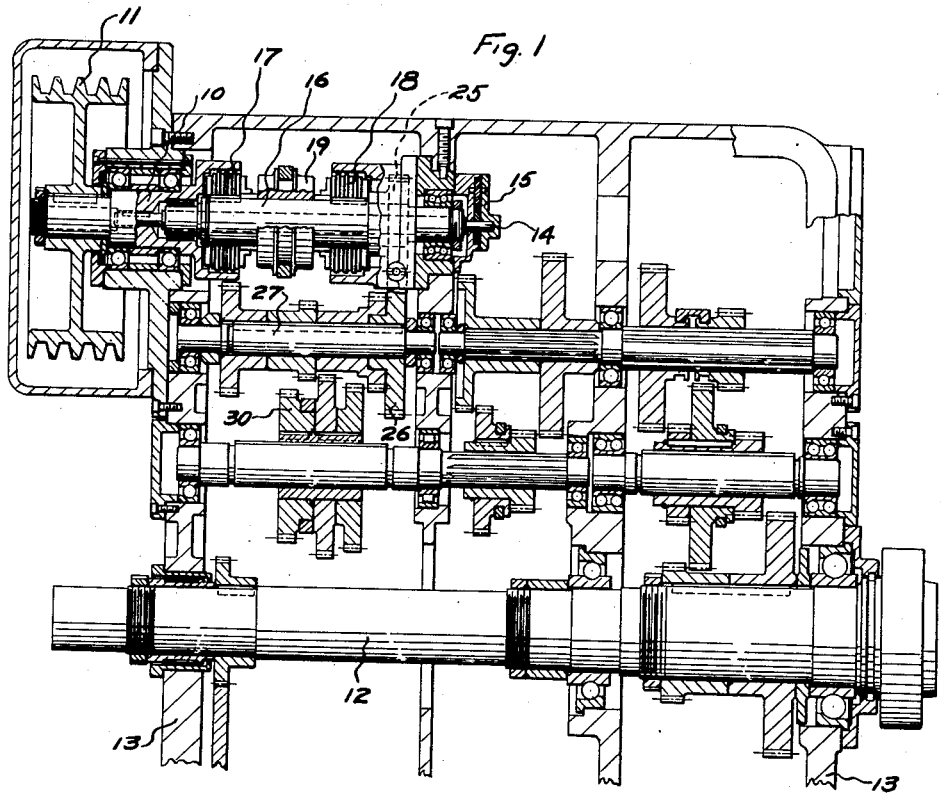
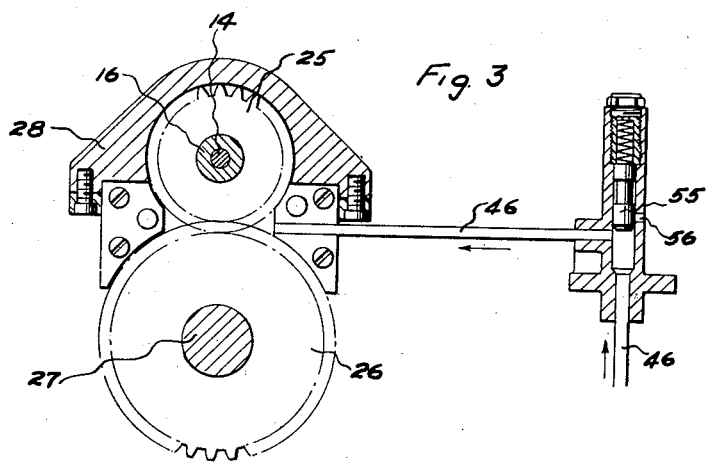
INVENTOR
A. G. WHITEHEAD
BY Joseph H. Schofield
ATTORNEY

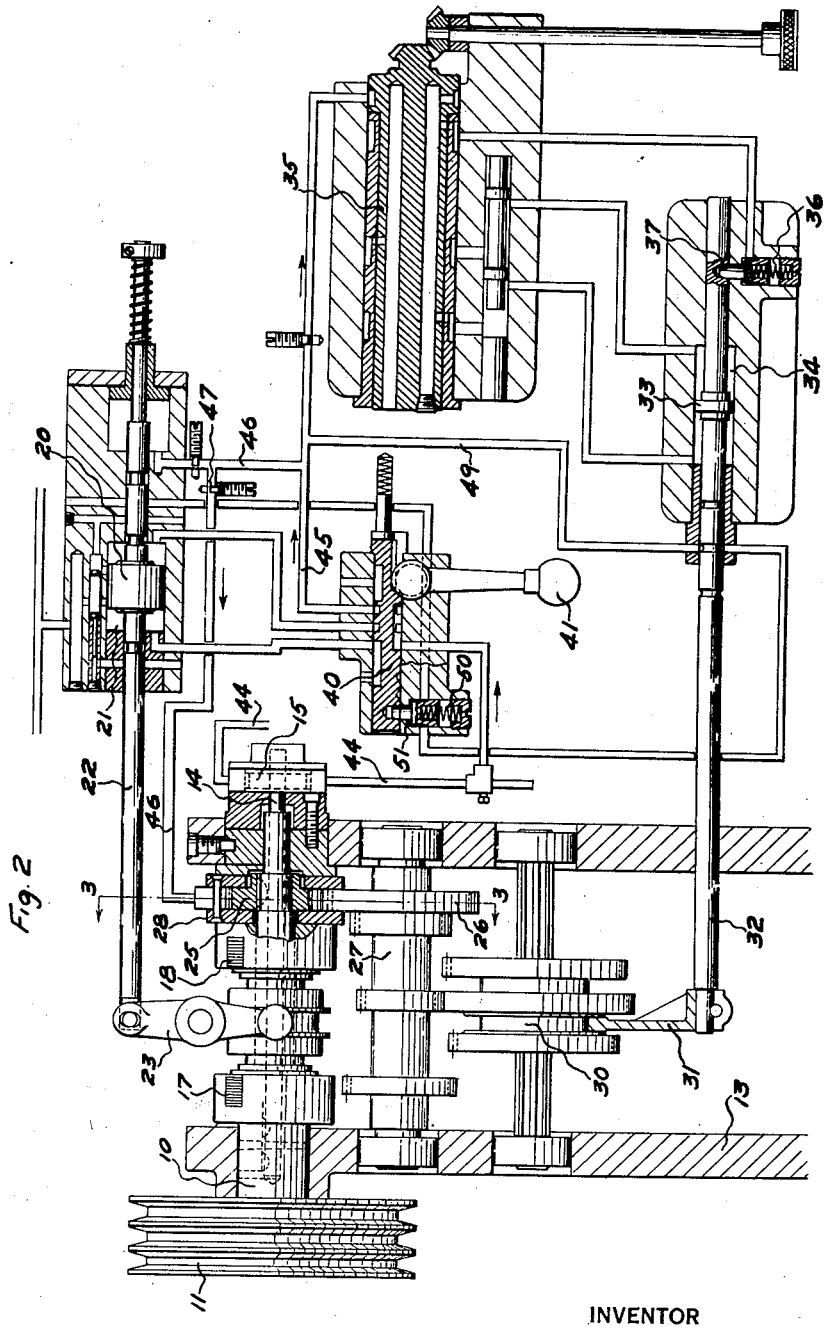

Patented Oct. 24, 1939

2,177,011

UNITED STATES PATENT OFFICE 2,177,011

HYDRAULIC GEAR-SHIFTING MECHANISM

Alexander G. Whitehead, Hartford, Conn., assignor to Niles-Bement-Pond Company, Hartford, Conn., a corporation of New Jersey Application December 23, 1937, Serial No. 181,346

10 Claims. (Cl. 74—339)

This invention relates to sliding gear transmissions and particularly to a hydraulically operated gear shifting device to obtain different rotative speeds for the spindle of a lathe or other machine tool.

A primary object of the present invention is to provide driving means supplementary to the normal driving means to slowly rotate the driving shafts one after the other as successive gears are shifted to new positions to facilitate intermeshing of different pairs of gears to effect changes in the rotative speed of the driven spindle.

A feature which enables me to accomplish the above named object is that there is provided a small fluid operated motor adapted to be supplied with fluid under pressure when gears are to be shifted in order that the gears may be slowly rotated to facilitate intermeshing relation with other gears of the mechanism.

Another object of the invention is to provide means to supply fluid to this supplementary motor only during gear-shifting operations and, during normal operation of the machine, to permit the gears to revolve freely without any pump or motor action.

Another feature which is important is that the gears forming the fluid motor constitute two of the driving gears of the mechanism which are constantly in mesh and one of which is on and rotates the first driving shaft of the transmission.

This application constitutes an improvement upon the construction disclosed in application Serial No. 30,302, filed July 8, 1935, in which applicant is one of the co-inventors.

With the above and other objects in view, my invention consists in the features of construction and operation set forth in the following specification and illustrated in the accompanying drawings.

In the accompanying drawings annexed hereto and forming a part of this specification, I have shown the invention embodied in the headstock of a machine tool such as a lathe, but it will be understood that the invention can be otherwise embodied and that the drawings are not to be construed as defining or limiting the scope of the invention, the claims appended to this specification being relied upon for that purpose.

In the drawings:

Figure 1 is substantially a horizontal sectional view taken through the planes of the driving shafts of the change speed mechanism and showing complete multi-speed driving connections from a primary driving shaft to the spindle of a machine tool.

Fig. 2 is a diagrammatic view of a portion of the hydraulic system controlling operation of the gear shifting mechanism and showing the supplemental driving means for rotating the primary driving shaft at slow speed during the gear shifting operation; and Fig. 3 is a sectional view taken upon the line 3—3 of Fig. 2 showing a side elevation of the fluid motor by means of which the primary driving shaft is slowly rotated during the gear shifting operation.

In the above mentioned drawings there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a driving shaft adapted to be rotated at a constant and relatively high speed by means of a driving pulley at one end; second, a fluid pump constantly driven by this constant speed shaft; third, a driving shaft preferably in the form of a sleeve surrounding the constant speed shaft and having thereon a driving and brake clutch; fourth, a gear keyed to this sleeve and constantly in mesh with a gear on the first intermediate driving shaft of the change speed mechanism; fifth, a casing surrounding a portion of these gears enabling the gears to operate as a hydraulic motor when supplied with fluid under pressure; sixth, slidably mounted gears between the first intermediate shaft and the driven machine tool spindle; seventh, hydraulic mechanism for effecting their sliding movements to different operative positions; eighth, a distributing valve to select the particular gears to be shifted; ninth, a manual control valve movable to a neutral or spindle braking position, to an operative or spindle driving position and to a third or gear-shifting position; tenth, fluid connections in the hydraulic system for admitting fluid under pressure during the gear shifting operation to the space immediately surrounding and between the gears on the driving spindle and the first intermediate shaft above referred to; eleventh, a normally closed valve in the fluid passage to this motor movable to open position when fluid under pressure is admitted to the conduit and which is moved to closed position when this fluid pressure is discontinued; and twelfth, means to vent the fluid motor when its valve is closed.

Referring more in detail to the figures of the drawings, I provide a main driving spindle 10 at one end of which is secured a driving pulley 11 adapted to be driven by any suitable means such as a motor (not shown) at a constant and relatively high speed. This spindle 10 may be rotatably mounted in a headstock or other body member 13 within which is rotatably mounted a work or tool supporting spindle 12. The headstock 13 shown in the drawings is that of a standard form of engine lathe, the spindle 12 of which may be rotated at a number of different predetermined speeds.

The driving spindle 10 may, as shown, have mounted thereon and constantly driven thereby an elongated spindle 14 at the opposite end of which is a small gear or other form of fluid pump 15. This pump 15 will be constantly rotated while the pulley 11 is being rotated and will furnish fluid at any desired pressure for operating the gear shifting mechanism, also supplying lubricant, etc. Surrounding this elongated spindle 14 is a sleeve 16 which forms the primary driving shaft for the work supporting and rotating spindle 12 adapted to be driven by these change speed mechanisms at a number of different predetermined speeds. On this sleeve 16 are mounted a clutch 17 and a brake 18, one of which is the main driving clutch 17 connecting the sleeve 16 with the driving spindle 10, and the other of which is a brake to stop rotation of the sleeve 16. The clutch and brake 17 and 18 respectively are adapted to be engaged one or the other by means of a spool 19 movable along the sleeve 16 and preferably actuated by a piston 20 within a cylinder 21 acting through an appropriate connecting arm 22 and yoke member 23. As this clutch 17 and brake 18 and their operating means are or may be similar to the corresponding mechanism shown in the above-referred to copending application, further description is not thought to be necessary.

Mounted on sleeve 16 at one end thereof and keyed thereto is a gear 25 in mesh constantly with a gear 26 on the first intermediate shaft 27 of the speed change mechanism. Surrounding the gear 25 on the sleeve 16 and partially surrounding the gear 26 on the first intermediate shaft 27 is an enclosing casing 28 which will be referred to more in detail at a later portion of the specification. By means of this casing 28 there is formed a fluid motor of the gear type so that when fluid under pressure is supplied through this casing 28 to the space immediately surrounding the intermeshing gear teeth the gears 25 and 26 and their shafts 16 and 27 will be rotated.

Means are shown in the diagrammatic view (Fig. 2) for positioning a slidable cluster of gears 30 to three different driving positions to drive the headstock spindle 12 at three selected speeds. It will be understood that a number of other slidable gear clusters indicated in Fig. 1 may be similarly operated to give the desired number of different speeds to the spindle 12. This gear cluster 30 is movable to its three operative positions by means of a yoke 31 and rod or bar 32, the bar having a small piston 33 thereon slidable within a suitable cylinder 34 to which fluid may be supplied at either extreme end. By means of the distributing valve 35 fluid may be supplied from the fluid pump 15 through the valve 35 and to either end of this cylinder 34 and when called for to a small cylinder 36 controlling the position of a detent 37, the purpose of the detent or plunger being to stop movement of the piston 33 in its intermediate operative position as shown in Fig. 2.

The main control valve 40 is manually operated as by means of a handle 41 to three longitudinal positions. These positions and the operation of this valve correspond in every way to the corresponding valve in the above-referred to application. The position of the valve 40 shown in Fig. 2 is that in which fluid is supplied to effect the gear shifting operations. It will be seen by reference to Fig. 2 that fluid from a tank or sump (not shown) is admitted through a suitable conduit or tubing 44 to the gear pump 15 and by the gear pump is delivered under suitable pressure to the surface of the cylinder within which the control valve 40 operates. With the control valve 40 in the position shown, the fluid is admitted to the conduit 45 leading to the distributing valve 35 from which valve it is distributed to the necessary cylinders such as 34 to move the required gear clusters, one only of which is shown in the diagrammatic view. Also fluid is admitted through a branch conduit 46 to the casing 28 surrounding the gear 25 on the driving sleeve 16. This supply of fluid therefore causes the gears 25 and 26 on the sleeve and the first intermediate shaft to rotate, the supply of fluid being in such quantity only that the rotative speed is relatively low as compared to the rotative speed when operated by the constant speed pulley 11. To regulate the amount of fluid supplied to the gears 25 and 26 a small regulating valve 47 may be provided in the conduit 46. By means of this low speed rotation of the sleeve 16 and driving shaft 27 intermeshing relationship between the gear teeth of one of the cluster gears 30 with its corresponding gear on shaft 27 is facilitated. Also as additional shafts have their gears shifted they also will be slowly rotated to facilitate successive shifting operations.

There is also shown in Fig. 2 a hydraulic interlocking system to retain the control valve 40 in its gear shifting position until the operation of shifting all of the gears is complete. This interlocking system includes a conduit 49 which when all of the gears required for changing to a selected speed have been shifted will admit fluid under pressure from the fluid supply conduit 45 past the gear shifting rods such as 32 to a small cylinder 50 within which a detent 51 is slidably mounted. In its inner position, to which the detent 51 is moved by a spring, the control valve 40 is locked in position. As soon, however, as fluid is admitted to cylinder 50 the detent 51 is retracted by fluid pressure within its cylinder 50, thus permitting movement of the valve 40 to another intermediate or operative position.

In the branch conduit 46 leading to the gear motor 25—26 is a small spool valve 55 normally spring pressed to a position closing the conduit. With pressure admitted to the conduit to supply fluid to the motor formed by gears 25 and 26 the valve 55 is forced to its open position. As soon as the fluid being admitted to the motor is discontinued the valve 55 moves to its closed position by means of its spring. In this position of the valve there is opened a vent 56 to atmosphere permitting air to enter the motor casing 28 past a neck portion formed in the valve. By this means the gears 25 and 26 rotate at atmospheric pressure without the pumping action of the gears forming a vacuum in the conduit from the main control valve to the motor casing.

In operation of the mechanism whenever the control valve 40 is moved to its gear shifting position the gears 25 and 26 are slowly rotated by fluid passing through the cylinder in which the valve 40 operates and then through conduit 46. As soon as the valve 40 is moved from its gear shifting position no fluid passes to the conduit 46 or to the supplementary motor formed by gears 25 and 26. While in gear shifting position of valve 40 shaft 27 is slowly rotated by gear 25 through gear 26 so that meshing of one of the gears on shaft 27 with one of the cluster gears 30 is facilitated. Successively, other shafts are rotated as their gears come into meshing relationship and are also slowly rotated until all driving connections to spindle 12 are completed.

During normal operation of the mechanism the clutch 16 is engaged and shaft 27 is driven at high speed by gear 26 directly from the driving sleeve 16 and pulley 11. At all times when the pulley 11 is rotating the shaft 14 extending through sleeve 16 is rotated at normal speed and operates fluid pump 15 so that fluid under pressure will be available during the operation of the mechanism to normally rotate spindle 12 during operation and during the operation of shifting the gears.

I claim as my invention:

1. A multi-speed transmission having gears movable to different operative positions comprising in combination, a primary driving shaft, means to rotate said shaft at a normal speed, intermediate shafts driven by said primary driving shaft, slidable gears on said last mentioned shafts, a fluid operated motor comprising intermeshing gears respectively on said primary driving shaft and an intermediate shaft, and means to supply fluid under pressure to said motor when said gears are to be moved to different operative positions.

2. A multi-speed transmission having gears movable to different operative positions comprising in combination, a primary driving shaft, means to rotate said shaft at a normal speed, intermediate shafts driven by said primary driving shaft, slidable gears on said last mentioned shafts, a fluid operated motor comprising intermeshing gears respectively on said primary driving shaft and an intermediate shaft, means to supply fluid under pressure to said motor when said gears are to be moved to different operative positions, and a control valve movable to operative and to gear-shifting positions.

3. A multi-speed transmission having gears movable to different operative positions comprising in combination, a primary driving shaft, means to rotate said shaft at a normal speed, intermediate shafts driven by said primary driving shaft, slidable gears on said last mentioned shafts, a fluid operated motor comprising intermeshing gears respectively on said primary driving shaft and an intermediate shaft whereby said primary shaft may be rotated by means supplementary to said first mentioned rotating means, and manually controlled means to supply fluid under pressure to said motor when said gears are to be moved to different operative positions.

4. A multi-speed transmission having gears movable to different operative positions comprising in combination, a primary driving shaft, means to rotate said shaft at a normal speed, intermediate shafts driven by said primary driving shaft, slidable gears on said last mentioned shafts, a fluid operated motor comprising intermeshing gears respectively on said primary driving shaft and an intermediate shaft, means to supply fluid under pressure to said motor when said gears are to be moved to different operative positions, and means to stop the supply of fluid to said motor and open said motor to atmosphere during normal operation of said transmission.

5. A multi-speed transmission having gears movable to different operative positions comprising in combination, a primary driving shaft, means to rotate said shaft at a normal speed, intermediate shafts driven by said primary driving shaft, slidable gears on said last mentioned shafts, a fluid operated motor comprising intermeshing gears respectively on said primary driving shaft and an intermediate shaft, a conduit to supply fluid under pressure to said motor, and valve means to open said conduit when said gears are to be moved to different operative positions and to close said conduit and open said motor to atmosphere during normal operation of said transmission.

6. A multi-speed transmission having gears movable to different operative positions comprising in combination, a primary driving shaft, clutch means thereon to drivingly connect said shaft to a source of power whereby said shaft may be rotated at relatively high speeds, intermediate shafts having gears slidably mounted thereon, means to effect movement of said gears, a gear on said primary driving shaft, a gear on an intermediate shaft meshing therewith, a casing surrounding portions of said gears, and means to supply fluid under pressure to the space within said casing, whereby said shafts may be rotated at a slow speed while said slidably mounted gears are being moved to different positions.

7. A multi-speed transmission having gears movable to different operative positions comprising in combination, a primary driving shaft, clutch means thereon to drivingly connect said shaft to a source of power whereby said shaft may be rotated at relatively high speeds, intermediate shafts having gears slidably mounted thereon, means to effect movement of said gears, a gear on said primary driving shaft, a gear on an intermediate shaft meshing therewith, a casing surrounding portions of said gears, a conduit to supply fluid under pressure to the space within said casing, whereby said shafts may be rotated at a slow speed while said slidably mounted gears are being moved to different positions, and a valve to close said conduit and open said casing to atmosphere during normal operation of said transmission.

8. A multi-speed transmission having gears movable to different operative positions comprising in combination, a primary driving shaft, clutch means thereon to drivingly connect said shaft to a source of power whereby said shaft may be rotated at relatively high speeds, fluid means to open and close said clutch, intermediate shafts having gears slidably mounted thereon, means to effect movement of said gears, a gear on said primary driving shaft, a gear on an intermediate shaft meshing therewith, a casing surrounding portions of said gears, means to supply fluid under pressure to the space within said casing, whereby said shafts may be rotated at a slow speed while said slidably mounted gears are being moved to different positions, and a manually operated valve controlling admission of fluid to said clutch operating means and to said casing.

9. A driving shaft for a sliding gear multi-speed mechanism comprising in combination, a rotatably mounted shaft, a clutch thereon whereby said shaft may be connected to a driving member, a fluid pump operated by said driving member, a gear secured to said shaft, an intermediate shaft having a gear thereon constantly meshing with said first mentioned gear, slidably mounted gears drivingly connecting said intermediate shaft to a spindle, a casing surrounding said constantly meshing gears, means to supply fluid from said pump to said casing to rotate said shaft by said constantly meshing gears acting as a fluid motor, whereby movement of said slidably mounted gears is facilitated by rotation effected by said fluid motor.

10. Driving means for a slidable gear multi-speed transmission comprising in combination, a primary driving shaft, intermediate shafts having slidably mounted gears thereon driven thereby, a spindle drivingly connected by selected slidable gears on said shafts to said primary driving shaft, means to rotate said primary shaft at a relatively high speed during normal operation of said transmission, and a fluid motor comprising a pair of intermeshing gears one of which is secured to said primary shaft, means to admit fluid under pressure to said motor, whereby said primary shaft may be rotated at a low speed while said slidably mounted gears are being moved to different operative positions.

ALEXANDER G. WHITEHEAD.